(12) United States Patent
Akbik et al.

(10) Patent No.: US 9,898,460 B2
(45) Date of Patent: Feb. 20, 2018

(54) GENERATION OF A NATURAL LANGUAGE RESOURCE USING A PARALLEL CORPUS

(71) Applicant: International Business Machines Corporation, Armonk, NY (US)

(72) Inventors: Alan Akbik, Berlin (DE); Laura Chiticariu, San Jose, CA (US); Marina Danilevsky Hailpern, San Jose, CA (US); Yunyao Li, San Jose, CA (US); Huaiyu Zhu, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 15/006,914

(22) Filed: Jan. 26, 2016

(65) Prior Publication Data
US 2017/0212890 A1 Jul. 27, 2017

(51) Int. Cl.
*G06F 17/27* (2006.01)
*G06F 17/30* (2006.01)
*G06F 17/28* (2006.01)

(52) U.S. Cl.
CPC ...... *G06F 17/2854* (2013.01); *G06F 17/2785* (2013.01); *G06F 17/289* (2013.01); *G06F 17/2827* (2013.01)

(58) Field of Classification Search
CPC ............... G06F 17/289; G06F 17/2818; G06F 17/2827

(Continued)

(56) References Cited

U.S. PATENT DOCUMENTS 7,672,830 B2  3/2010  Goutte et al.
8,204,739 B2  6/2012  Waibel et al.

(Continued)

OTHER PUBLICATIONS

Yarowsky, David et al., "Inducing Multilingual Text Analysis Tools via Robust Projection across Aligned Corpora", Proceedings of HLT 2001, First International Conference on Human Language Technology Research, San Francisco, CA, USA, 2001, 9 pages, J. Allan, ed., Morgan Kaufmann.

(Continued)

*Primary Examiner* — Paras D Shah
*Assistant Examiner* — Timothy Nguyen
(74) *Attorney, Agent, or Firm* — Ference & Associates LLC (57) ABSTRACT

One embodiment provides a method for generating a natural language resource using a parallel corpus, the method including: utilizing at least one processor to execute computer code that performs the steps of: receiving, from a parallel corpus, natural language text in a source language and a corresponding translation of the natural language text in a target language, wherein the natural language text in the source language comprises linguistic annotations; projecting the linguistic annotations from the source language natural language text to the target language natural language text; applying one or more filters to remove at least one projected linguistic annotation from the target language natural language text that results in at least one error; selecting at least one target language natural language text having substantially complete linguistic annotations; training a machine learning model using the selected at least one target language natural language text and annotations; and adding, using the trained machine learning model, linguistic annotations to at least one target language natural language text having incomplete linguistic annotations. Other aspects are described and claimed.

20 Claims, 5 Drawing Sheets

(58) Field of Classification Search
USPC .......................................................... 704/9
See application file for complete search history.

(56) References Cited

U.S. PATENT DOCUMENTS

| | | | | |
|---|---|---|---|---|
| 8,655,641 | B2* | 2/2014 | Kumano | G06F 17/2836 704/2 |
| 8,788,258 | B1 | 7/2014 | Bangalore et al. | |
| 9,002,869 | B2* | 4/2015 | Riezler | G06F 17/30672 704/10 |
| 9,465,797 | B2* | 10/2016 | Ji | G06F 17/2818 |
| 2005/0228643 | A1* | 10/2005 | Munteanu | G06F 17/2809 704/9 |
| 2006/0095248 | A1* | 5/2006 | Menezes | G06F 17/2818 704/3 |
| 2009/0177460 | A1* | 7/2009 | Huang | G06F 17/2818 704/2 |
| 2012/0316862 | A1 | 12/2012 | Sultan et al. | |
| 2013/0204606 | A1 | 8/2013 | Zong et al. | |
| 2014/0205974 | A1* | 7/2014 | Pellom | G09B 19/06 434/157 |
| 2015/0127321 | A1 | 5/2015 | Waibel et al. | |
| 2015/0169549 | A1 | 6/2015 | Das et al. | |

OTHER PUBLICATIONS

Pado, Sebastian et al., "Cross-lingual Annotation Projection of Semantic Roles", Journal of Artificial Intelligence Research, Sep. 2009, 34 pages, vol. 36, Issue 1, AI Access Foundation, USA.

Hwa, Rebecca et al., "Evaluating Translational Correspondence using Annotation Projection", Proceedings of the 40th Annual Meeting of the Association for Computational Linguistics (ACL0, Philadelphia, PA, USA, Jul. 2002, pp. 392-399, CiteSeer, PA, USA.

Tackstrom, Oscar et al., "Token and Type Constraints for Cross-Lingual Part-of-Speech Tagging", Transactions of the Association for Computational Linguistics, 2013, 12 pages, 2013 Association for Computational Linguistics.

Van Der Plas, Lonneke et al., "Scaling up Automatic Cross-Lingual Semantic Role Annotation", Proceedings of the 49th Annual Meeting of the Association for Computational Linguistics:shortpapers, Portland, Oregon, USA, Jun. 19-24, 2011, pp. 299-304, 2011 Association for Computational Linguistics.

Van Der Plas, Lonneke et al., "Global Methods for Cross-lingual Semantic Role and Predicate Labelling", Proceedings of COLING 2014, the 25th International Conference on Computational Linguistics: Technical Papers, Aug. 23-29, 2014, Dublin, Ireland, pp. 1279-1290.

* cited by examiner

Require: Corpus $C_{TL}$ with initial set of labels $L_{TL}$, and resampling threshold function $k(i)$;

for $i = 1$ to $\infty$ do

Let $k_i = k(i)$;

Let $C_{TL}^{comp} = \{w \in C_{TL} : w \in S_{TL}, S_{TL}$ is $k_i$-complete$\}$;

Let $L_{TL}^{comp}$ be subset of $L_{TL}$ appearing on $C_{TL}^{comp}$;

Train an machine learning model on $(C_{TL}^{comp}, L_{TL}^{comp})$;

Use the machine learning model to produce label set $L_{TL}^{new}$ on $C_{TL}$;

Let $C_{TL}^{no.lab} = \{w \in C_{TL} : w$ not labeled by $L_{TL}\}$;

Let $L_{TL}^{suppl}$ be subset of $L_{TL}^{new}$ appearing on $C_{TL}^{no.lab}$;

if $L_{TL}^{suppl} = 0$ then

Return the machine learning model;

end if

Let $L_{TL} = L_{TL} \cup L_{TL}^{suppl}$;

end for

GENERATION OF A NATURAL LANGUAGE RESOURCE USING A PARALLEL CORPUS

BACKGROUND

Linguistic annotations (e.g., semantic role labeling (SRL), etc.) has proven crucial to understanding natural languages. Semantic role labeling is the task of automatically labeling predicates and arguments in a sentence with shallow semantic labels. Analyzing sentences in the form of predicates and arguments provides a more stable semantic representation across syntactically different sentences, thereby enabling a range of NLP (natural language processing) tasks such as information extraction and question answering. Additionally, by annotating words and expressions with linguistic annotations supervised learning of statistical linguistic parsers is possible.

Previous projects and entities have spent considerable effort to manually annotate English corpora with linguistic annotations. Such annotations have enabled supervised learning of statistical linguistic parsers for English. However, because annotating is generally completed manually, the number of linguistic resources available is greatly reduced, and for most languages these linguistic resources do not exist.

BRIEF SUMMARY

In summary, one aspect of the invention provides a method for generating a natural language resource using a parallel corpus, the method comprising: utilizing at least one processor to execute computer code that performs the steps of: receiving, from a parallel corpus, natural language text in a source language and a corresponding translation of the natural language text in a target language, wherein the natural language text in the source language comprises linguistic annotations; projecting the linguistic annotations from the source language natural language text to the target language natural language text; applying one or more filters to remove at least one projected linguistic annotation from the target language natural language text that results in at least one error; selecting at least one target language natural language text having substantially complete linguistic annotations; training a machine learning model using the selected at least one target language natural language text and annotations; and adding, using the trained machine learning model, linguistic annotations to at least one target language natural language text having incomplete linguistic annotations.

Another aspect of the invention provides an apparatus for generating a natural language resource using a parallel corpus, the apparatus comprising: at least one processor; and a computer readable storage medium having computer readable program code embodied therewith and executable by the at least one processor, the computer readable program code comprising: computer readable program code that receives, from a parallel corpus, natural language text in a source language and a corresponding translation of the natural language text in a target language, wherein the natural language text in the source language comprises linguistic annotations; computer readable program code that projects the linguistic annotations from the source language natural language text to the target language natural language text; computer readable program code that applies one or more filters to remove at least one projected linguistic annotation from the target language natural language text that results in at least one error; computer readable program code that selects at least one target language natural language text having substantially complete linguistic annotations; computer readable program code that trains a machine learning model using the selected at least one target language natural language text and annotations; and computer readable program code that adds, using the trained machine learning model, linguistic annotations to at least one target language natural language text having incomplete linguistic annotations.

An additional aspect of the invention provides a computer program product for generating a natural language resource using a parallel corpus, the computer program product comprising: a computer readable storage medium having computer readable program code embodied therewith, the computer readable program code comprising: computer readable program code that receives, from a parallel corpus, natural language text in a source language and a corresponding translation of the natural language text in a target language, wherein the natural language text in the source language comprises linguistic annotations; computer readable program code that projects the linguistic annotations from the source language natural language text to the target language natural language text; computer readable program code that applies one or more filters to remove at least one projected linguistic annotation from the target language natural language text that results in at least one error; computer readable program code that selects at least one target language natural language text having substantially complete linguistic annotations; computer readable program code that trains a machine learning model using the selected at least one target language natural language text and annotations; and computer readable program code that adds, using the trained machine learning model, linguistic annotations to at least one target language natural language text having incomplete linguistic annotations.

A further aspect of the invention provides a method for generating a natural language resource using a parallel corpus, the method comprising: utilizing at least one processor to execute computer code that performs the steps of: receiving, from a parallel corpus, natural language text in a source language and a corresponding translation of the natural language text in a target language, wherein the natural language text in the source language comprises linguistic annotations; projecting the linguistic annotations from the source language natural language text to the target language natural language text; applying one or more filters to remove at least one projected linguistic annotation from the target language natural language text that results in at least one error, wherein the one or more filters are selected from the group consisting of: a filter for correcting a translation shift error and a reattachment heuristic filter; selecting at least one target language natural language text having substantially complete linguistic annotations; training a machine learning model using the selected at least one target language natural language text and annotations; adding, using the trained machine learning model, linguistic annotations to at least one target language natural language text having incomplete linguistic annotations; conducting at least one additional iteration of the selecting at least one target language natural language text, the training a machine learning model, and the adding linguistic annotations; generating a natural language resource, based upon the at least one additional iteration, comprising a plurality of target natural language text having annotations; and training a natural language annotator using the natural language resource.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an exemplary embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

Linguistic annotations (e.g., semantic role labeling (SRL), etc.) are very useful in understanding natural languages. Some projects have used manual annotation to annotate corpora, but such a method is very time and cost intensive. Therefore, as an alternative to manual annotation, the direct projection of linguistic labels from a resource rich source language (e.g., English) to a resource poor target language in parallel corpora has been explored. One problem with such an approach is that the underlying assumption is that original and translated sentences in parallel corpora are linguistically broadly equivalent. Hence, if English sentences of a parallel corpus are automatically labeled using a linguistic annotation system, these labels can be projected onto aligned words in the target language corpus, thereby automatically labeling the target language corpus with linguistic labels. The problem with this approach is that aligned sentences in parallel corpora often exhibit mismatches and errors. Thus, a source language sentence translated into a target language may result in a highly awkward and incorrectly constructed translated target language sentence.

Accordingly, broadly contemplated herein, in accordance with at least one embodiment of the invention, are methods and arrangements for generating a natural language resource using a parallel corpus. A parallel corpus is a corpus having natural language text (e.g., sentences, phrases, words, etc.) in a first language ("source language") and a corresponding translation of the word expressions in a second language ("target language"). The parallel corpus used in the systems and methods described herein additionally include linguistic annotations (e.g., semantic role labels, syntactic labels, etc.) for the source language. An embodiment may receive a natural language text in both a source language and a target language version.

An embodiment may then project the linguistic annotations from the source language to the target language natural language text. An embodiment may then identify projected annotations that are likely incorrect or contain errors and use one or more filters to remove these incorrect annotations. Once the incorrect annotations have been removed, an embodiment may identify one or more target language texts in which the linguistic annotations are complete or mostly complete. These can then be used to train a machine learning model. The machine learning model may then add or overwrite annotations of target language natural language texts that are missing annotations or have incorrect annotations. Then using these newly completed annotations, the machine learning model can be additionally trained. Multiple iterations of this method can then result in a machine learning model which is more accurate and complete. In other words, by using correct annotations and adding annotations, a machine learning model can be trained using a bootstrap learning method. Once the machine learning model is trained, a natural language resource may be generated, which may include the machine learning model. The natural language resource may then be used to train a natural language annotator.

The features discussed above, and others, relating to at least one embodiment of the invention, will be better appreciated from the discussion which follows.

Figure 1:
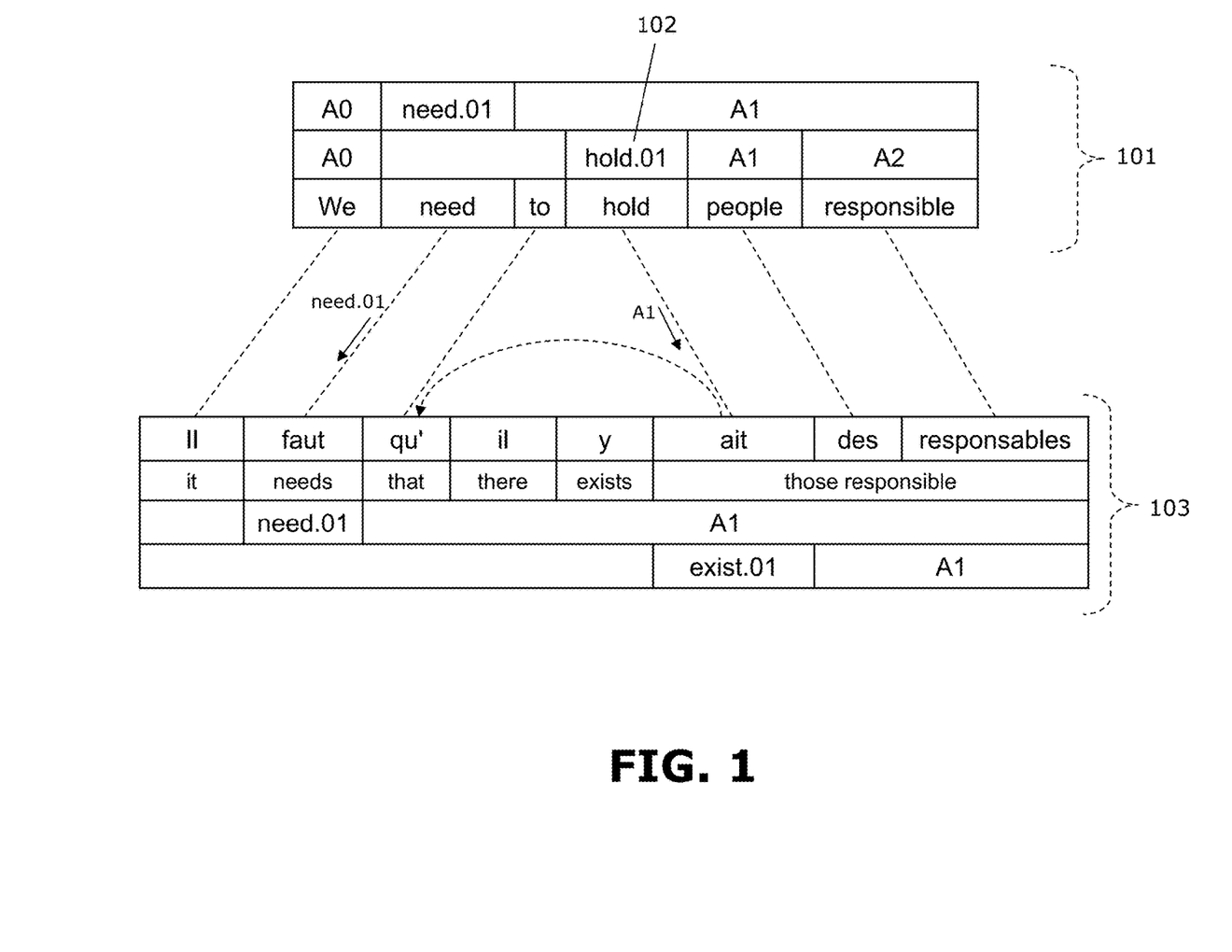
FIG. 1 depicts an example of direct projection from a source language to a target language.

In accordance with a general background relative to at least one embodiment of the invention, FIG. 1 illustrates an example of direct projection from a source language to a target language, and potential problems encountered therewith. Illustrated is a structured English (the source language as used in the example) sentence (101) and a structured French (the target language as used in this example) sentence (103). Here, the English sentence "We need to hold people responsible" (101) is translated, using direct projection, into the French sentence that literally reads as "There need to exist those responsible" (103). Hence, the predicate label 102 of the English word "hold" should not be projected onto the French verb "ait", because the word has a different meaning than was intended. As the example in FIG. 1 shows, this means that only a subset of the source language labels can be directly projected and result in a correctly identified sentence.

Generally, in accordance with at least one embodiment of the invention, resources can be created for a range of languages from different language groups in view of the versatility afforded by methods and arrangements as broadly contemplated herein. To this end, there is broadly contemplated herein a two-stage approach to cross-lingual linguistic labeling that addresses such errors. Such a two-stage approach is illustrated generally, and schematically, in FIG. 2. Given a parallel corpus, provided as input 205, the source language side (207) is automatically labeled with labels. In one embodiment, the target language side (209) may be syntactically parsed, for example, using an accessible syntactic parser. A projection filtering stage (211), also referred to as a "first stage" herein, is then undertaken in which a filter policy 213 is applied to a step of filtered projection (215) to ensure the projection only of high-confidence source language labels. This results in a target language corpus of linguistic labels (217) (for example, semantic labels including predicates and arguments) with low recall but high precision.

In accordance with a least one embodiment of the invention, in a subsequent, "second" stage of bootstrapped learning (219), a subset of complete target language sentences is repeatedly sampled, and a classifier trained, to iteratively add new labels, significantly increasing the recall in the target language corpus while retaining an improvement in precision. Thus, the linguistic target language labels (217) from the "first stage" of projection filtering (211) may first be checked for completeness (221). The result of this step is to yield a set of syntactic and incomplete target language linguistic labels (223) and a set of complete syntactic labels (225). Thus, a learning process 227 takes place relative to the "complete" set (225), whereby a model for linguistic labeling is developed (229), to the benefit of the "incomplete" set 223, whereupon the "learned" labels can be iteratively applied anew (231) to a target language set resulting from filtered projection (217). While this provides a general overview, further details of a process as broadly illustrated in FIG. 2 may now be appreciated from the ensuing discussion.

Figure 2:
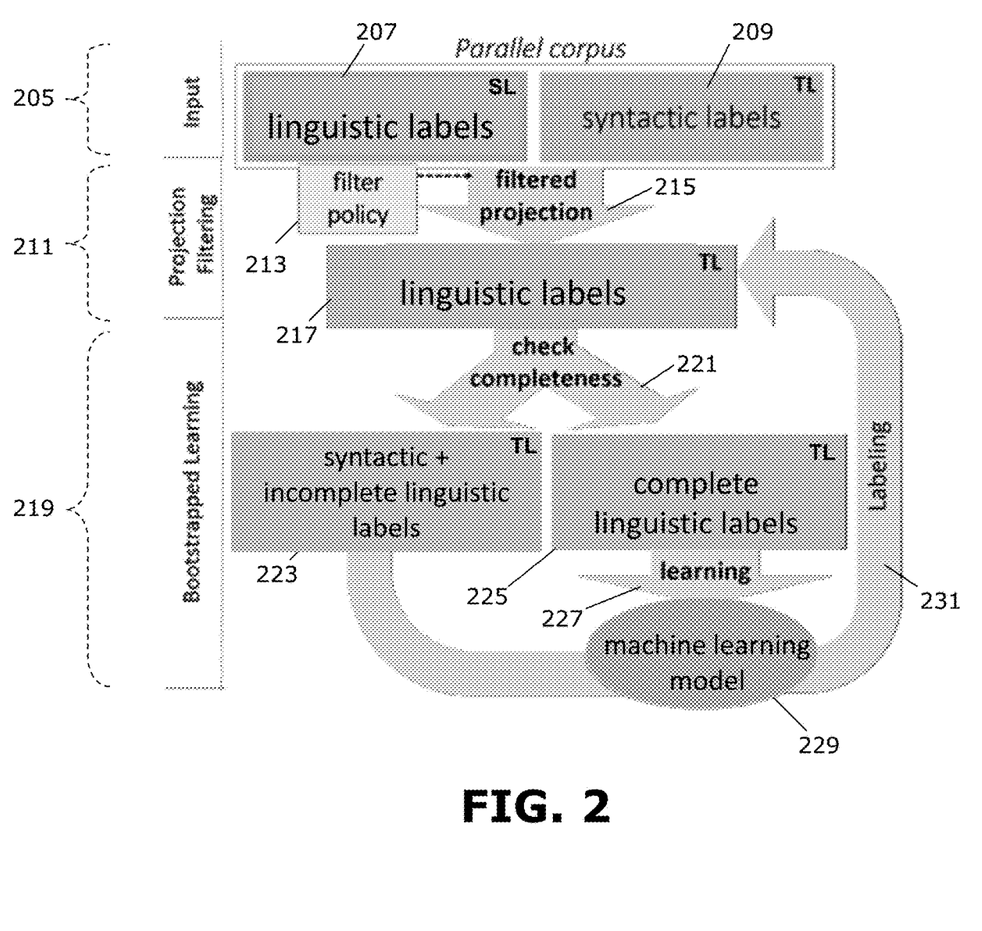
FIG. 2 schematically illustrates aspects of a two-stage approach to cross-lingual linguistic annotating.

In accordance with at least one embodiment of the invention, a first stage of projection filtering (211) aims to create a target language corpus with high precision linguistic labels. As such, it is recognized that a conventional process of direct annotation projection involves transferring linguistic labels from source language sentences to target language sentences according to word alignments. Formally, for each pair of sentences in a parallel corpus, the word alignment produces alignment pairs. An alignment pair includes a word from the source language sentence and a corresponding word from the target language sentence. Under direct projection, if a word in the source language has a linguistic label, for example, a predicate label, and the word is part of an alignment pair, the predicate label is transferred to the target word that is part of the alignment pair. Similarly, if a word in the source language has a linguistic label, for example, a predicate-argument label, and the word is part of an alignment pair, the predicate-argument label is transferred to the target word that is part of the alignment pair.

On the other hand, it is recognized, in accordance with at least one embodiment of the invention, that direct projection is vulnerable to errors stemming from issues such as translation shifts. Accordingly, broadly contemplated herein is a manner of filtered projection that focuses specifically on improving the precision of projected labels. Specifically, for a pair of sentences in a parallel corpus, the linguistic label projected from a source language word to a target language word is retained only if it satisfies filtering policies. This results in a target corpus containing fewer labels but of higher precision compared to that obtained via direct projection.

It should be understood, in accordance with at least one embodiment of the invention, that filtered projection as broadly discussed and contemplated herein need not at all be restricted to the specific aspects disclosed. Thus, for instance, inasmuch as specific filters may be discussed for preventing, removing or mitigating projection errors, other filters are certainly conceivable. It can be appreciated that the use of different filters may be tailored based on prospective performance, and that such considerations may even be language specific (e.g., relative to the source language and/or target language alike). As such, the disclosure now turns to a brief discussion of various filters, as developed and employed in connection with sample data from English (used as the source language for the example) and French (used as the target language for the example).

As such, in accordance with a context relative to at least one embodiment of the invention, an illustrative example of how an experimental embodiment might work follows. First, experimentation with English (SL) and French (TL) involving a compiled data set was conducted. This data set may include 1,000 sentence-pairs from an English-French corpus, with French sentences manually labeled with predicate and argument labels from English. Here, synonymous predicate labels sharing the same class may be counted as "true positives"; for instance, the French verb sembler may be correctly labeled as either of the synonyms: seem.01 or appear.02. In addition, modal verbs may be excluded from evaluation due to inconsistent annotation. For the present working example, a conventional SRL system was used to produce semantic labels for English text.

Such direct projection labels have both low precision and low recall. Additionally, most semantic labels in the French sentences do not appear in the corresponding English sentences at all. Specifically, it was found that among 1,741 predicate labels in the French sentences, only 778 exist in the corresponding English sentences, imposing a 45% upper bound on the recall for projected predicates. Similarly, of the 5,061 argument labels in the French sentences, it was found that only 1,757 exist in the corresponding English sentences, resulting in a 35% upper bound on recall for arguments.

As such while the recall produced by direct projection is close to the theoretical upper bound, the precision is far from the theoretical upper bound of 100%. To understand causes of false positives, a random sample of 200 false positives were examined, of which 100 were incorrect predicate labels, and 100 were incorrect argument labels belonging to correctly projected predicates. Common errors will next be discussed here, while residual errors are discussed further below. It can thus continue to be appreciated that in a two-stage process as broadly contemplated herein, a filtered projection step attends mainly to common errors while the subsequent step of bootstrapped training can attend to residual errors not otherwise "caught" in the filtered projection step.

In accordance with a context relative to at least one embodiment of the invention, it was found in experimentation that the most common predicate errors were translation shifts in which an English predicate is aligned to a French verb with a different meaning. FIG. 1 illustrates such a translation shift: label hold.01 of English verb hold is wrongly projected onto the French verb ait, which is labeled as exist.01 in the data set. A translation shift from a verb to a non-verb represented another common predicate error. In other words, it was found that English verbs may be aligned with target language words other than verbs, which is often indicative of translation shifts.

In accordance with a context relative to at least one embodiment of the invention, it was found that the most common argument error in the present working example was caused by the projection of argument labels onto words other than the syntactic head of a target verb's argument. For example, in FIG. 1 the label A1 on the English hold is wrongly transferred to the French ait, which is not the syntactic head of the complement.

In accordance with at least one embodiment of the invention, in the present working example, some filters can be considered as removing the most common types of false positives, though as noted heretofore these should not at all be considered restrictive or exhaustive. A verb filter may target translation shift errors.

In accordance with at least one embodiment of the invention, in the present working example, a translation filter may handle both "predicate mismatch" and "verb to non-verb" translation shift errors. As such, a translation filter may make use of a translation dictionary and permit projection only if the target language verb is a valid translation of the source language verb. In addition, in order to ensure consistent predicate labels throughout the target language corpus, if a source language verb has several possible synonymous translations, it allows projection only for the most commonly observed translation.

In accordance with at least one embodiment of the invention, in the present working example, a reattachment heuristic filter, targets nonargument head errors that occur if a target language argument is not the direct child of a verb, for example, in the dependency parse tree of its sentence. Generally, reattachment heuristic filters ensure that labels are always attached to the syntactic heads of their respective arguments, as determined by the dependency tree. An example of such reattachment is illustrated in FIG. 1, depicted via the curved arrow on the target language sentence (103), between ait and qu'.

Generally, in accordance with at least one embodiment of the invention, in the present working example, it can be confirmed that "first-pass" filters, especially of the types discussed, are effective in improving precision of projected labels at a small cost in recall. In fact, translation filters and reattachment heuristic filters result in a large improvement in predicate and argument labels precision with a much smaller drop in recall. However, even with common errors removed, there remain residual errors.

As such, in accordance with at least one embodiment of the invention, in the present working example, different sources of residual errors can be identified. What follows is not an exhaustive or restrictive list, but merely some error types as may be identified from the present working example. Generally, the most common residual errors in the remaining projected labels, especially for argument labels, were found to be caused by mistakes made by the English linguistic annotation system. For example, if a wrong label is assigned to the source language sentence, the wrong label may then be projected onto the target language sentence, resulting in false positives. On the other hand, it was found that a small number of errors in the present working example occurred due to French particularities that do not exist in English. Such errors include certain French verbs for which no appropriate English labels exist, as well as French-specific syntactic particularities. As can be understood by one skilled in the art, such particularities are not just confined to English/French translations. Other residual errors, in the present working example, were inherent in the original data set itself. In other words, if the data set contains errors (e.g., missing argument labels), these errors may be seen in the translation and projection of the labels.

In accordance with at least one embodiment of the invention, bootstrapped training of linguistic labeling is broadly contemplated herein. As such, and as discussed earlier, a target language corpus generated via filtered projection can suffer from low recall. Accordingly, a bootstrap approach in a "second stage" (or second phase or step) can help mitigate the effect of such problems. In turn, such a bootstrap approach can be seen to be motivated by considerations relating to relabeling. Accordingly, the disclosure now briefly turns to relabeling and its manner of informing a presently contemplated bootstrap approach.

In accordance with a context relative to at least one embodiment of the invention, relabeling can normally involve training a machine learning model for labeling with linguistic annotations ("machine learning model") over a target language corpus labeled using direct projection. The machine learning model may then be used to relabel the target language corpus. Referring to the same experimental setup as discussed heretofore, and solely by way of a merely illustrative and non-restrictive example, a labeled French corpus can be considered for each filtered annotation method, whereupon an available machine learning model may be trained on each generated corpus, to then be used to relabel the corpus. In measuring precision and recall of each resulting target corpus against the data set, it was found that relabeling consistently improved recall over projection. The results also show how different factors affect the performance of relabeling.

As such, in accordance with a context relative to at least one embodiment of the invention, it was considered that labels produced by the trained machine learning model can be used to either overwrite projected labels, or to supplement them (i.e., supplying labels only for words without projected labels). Determining whether to overwrite or supplement labels, may depend on whether the labels produced by the trained machine learning model are of higher quality than the projected labels. For example, if predicted labels are of higher precision than directly projected labels, but of lower precision than labels post filtered projection, the predicted labels may only be used to supplement projected labels.

In accordance with at least one embodiment of the invention, in the present working example, the impact of sampling the data on the quality of relabeling is also worthy of exploration. For the best filter found earlier, the translation filter and reattachment heuristic filter, a comparison was made of a machine learning model trained on the entire data set with a machine learning model trained only on the subset of completely annotated sentences. It was observed that for the translation filter and the reattachment heuristic filter, when new labels supplement projected labels, relabeling over complete sentences results in better recall at slightly reduced precision, while including incomplete sentences into the training data reduces recall, but improves precision. While this finding may seem counterintuitive, it can be explained by how statistical linguistic annotations work. As such, it can be observed that a densely labeled training data set usually results in a machine learning model that generates densely labeled sentences, resulting in better recall but poorer precision. On the other hand, training data that are sparsely labeled result in a machine learning model that weighs the option of not assigning a label with higher probability, resulting in better precision and poorer recall. In short, it can be observed that one can control the tradeoff between precision and recall of a machine learning model output by manipulating the completeness of the training data.

Figure 3:
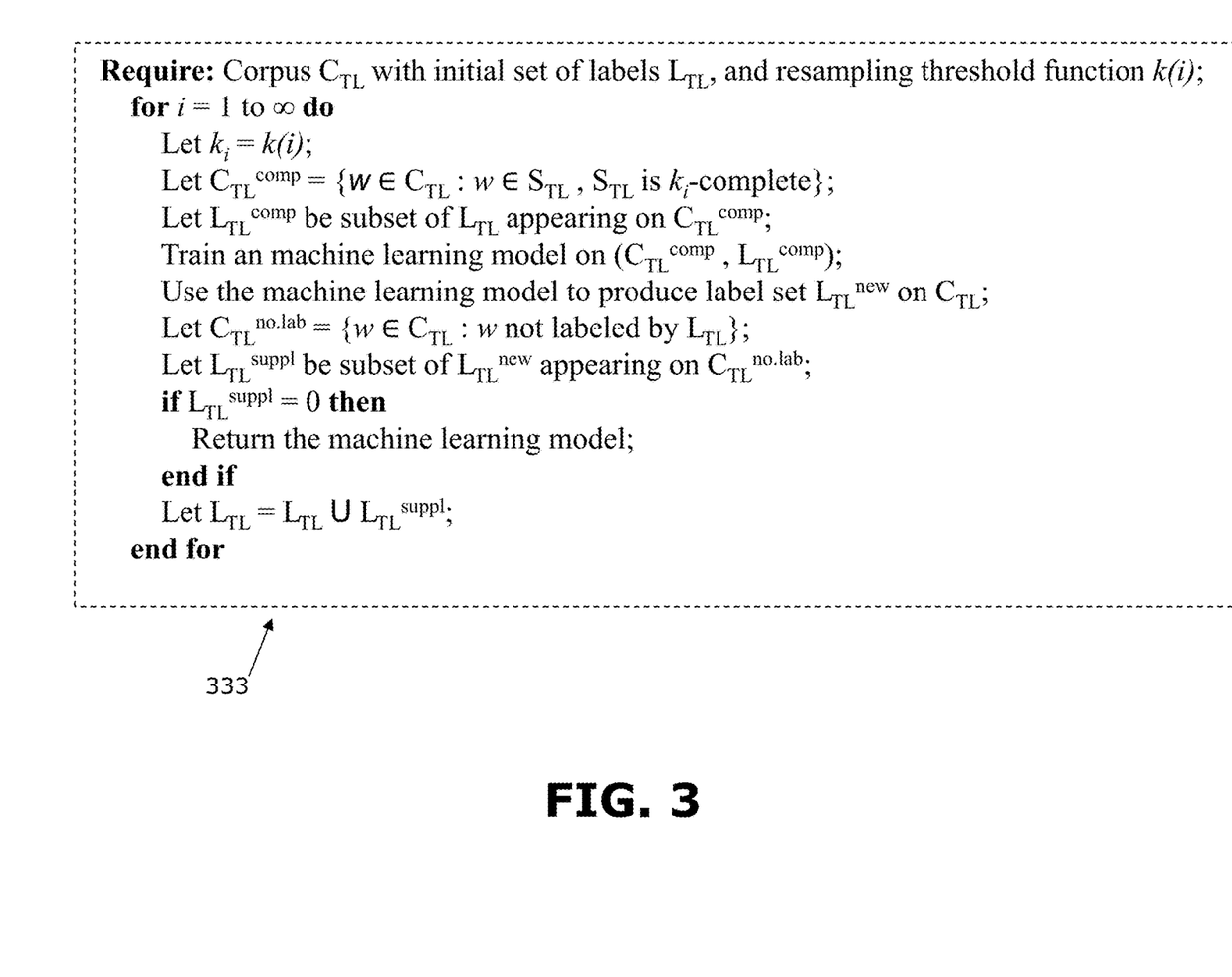
FIG. 3 sets forth a sample bootstrapping algorithm to train a machine learning model for labeling with linguistic annotations.

In accordance with at least one embodiment of the invention, building on an observation (based on the foregoing) that data can be sampled in such a way as to either favor precision or recall, there is broadly contemplated herein a bootstrapping algorithm to train an machine learning model iteratively over k-complete subsets of the data which are supplemented by high precision labels produced from previous iteration. The detailed algorithm (333) is depicted in FIG. 3. In establishing a resampling threshold, an objective is to use bootstrap learning to improve recall without overly sacrificing precision. Thus, a related proposition involves increasing the set of labels $L_{TL}$ monotonically in each iteration of the algorithm 333 in FIG. 3. Since this proposition guarantees an increase in the set of labels, a resampling function is selected to favor precision while improving recall. Specifically, we use the following formula, where $k_0$ is sufficiently large: $k(i)=\max (k_0-i, 0)$. Since the precision of labels generated by the machine learning model is lower than the precision of labels obtained from filtered projection, the precision of the training data is expected to decrease with the increase in recall. Therefore, starting with a high k seeks to ensure high precision labels are added to the training data in the first iterations. Decreasing k in each iteration seeks to ensure that resampling is done in an increasingly restrictive way to ensure that only high-quality annotated sentences are added to the training data, thus maintaining a high confidence in the learned machine learning model.

In brief recapitulation, it can be appreciated from the foregoing that there is broadly contemplated herein, in accordance with at least one embodiment of the invention, a two-staged method to construct multilingual machine learning models using monolingual linguistic annotations and parallel data, outperforming conventional approaches in both precision and recall. It has been found that such a method works well different languages without any language specific customization.

It can be appreciated from the foregoing that, in accordance with at least one embodiment of invention, a technical improvement is represented at least via provision of a two-stage process to permit construction of machine learning model for labeling with linguistic annotations for resource-poor languages, wherein this can involve exploiting monolingual linguistic annotations and multilingual parallel data.

In accordance with at least one embodiment of the invention, very generally, quantitative values as determined herein, or other data or information as used or created herein, can be stored in memory or displayed to a user on a screen, as might fit the needs of one or more users.

Figure 4:
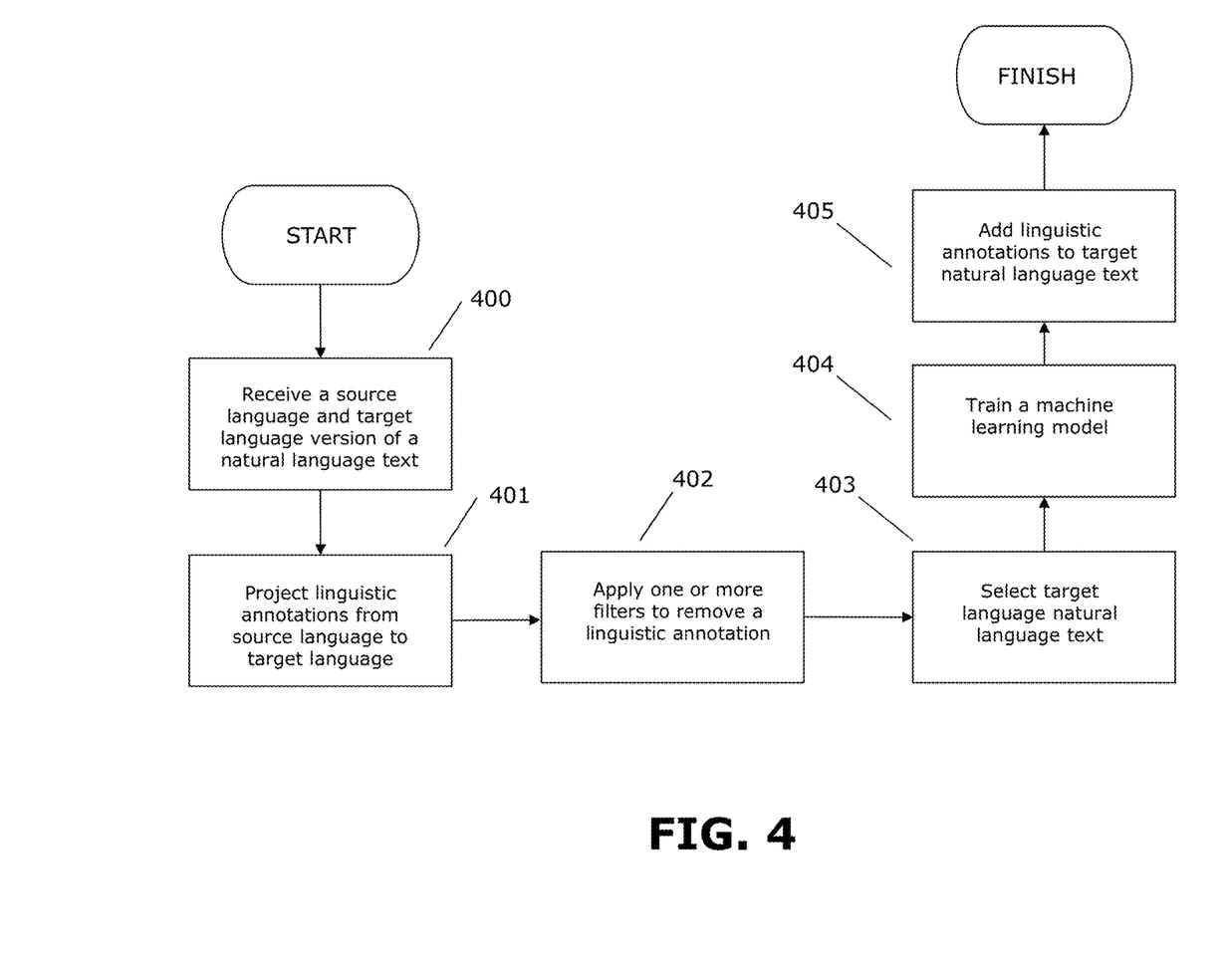
FIG. 4 sets forth a process more generally for generation of a natural language resource using a parallel corpus.

FIG. 4 sets forth a process more generally for annotating a word expression in a target language based upon a source language, in accordance with at least one embodiment of the invention. It should be appreciated that a process such as that broadly illustrated in FIG. 4 can be carried out on essentially any suitable computer system or set of computer systems, which may, by way of an illustrative and non-restrictive example, include a system such as that indicated at 12' in FIG. 5. In accordance with an example embodiment, most if not all of the process steps discussed with respect to FIG. 4 can be performed by way of a processing unit or units and system memory such as those indicated, respectively, at 16' and 28' in FIG. 5.

As shown in FIG. 4, in accordance with at least one embodiment of the invention, an embodiment may receive, from a parallel corpus, a natural language text in a source language and a corresponding translation of the natural language text in a target language, wherein the natural language text in the source language comprises linguistic annotations at 400. At 401 an embodiment may project the linguistic annotations from the source language natural language text to the target language natural language text. An embodiment may then apply one or more filters to remove at least one projected linguistic annotation from the target language natural language text that results in at least one error at 402. At 403 an embodiment may select at least one target language natural language text having substantially complete linguistic annotations. An embodiment may then train a machine learning model using the selected at least one target language natural language text and annotations at 404. At 405 an embodiment may add, using the trained machine learning model, linguistic annotations to at least one target language natural language text with incomplete linguistic annotations.

Figure 5:
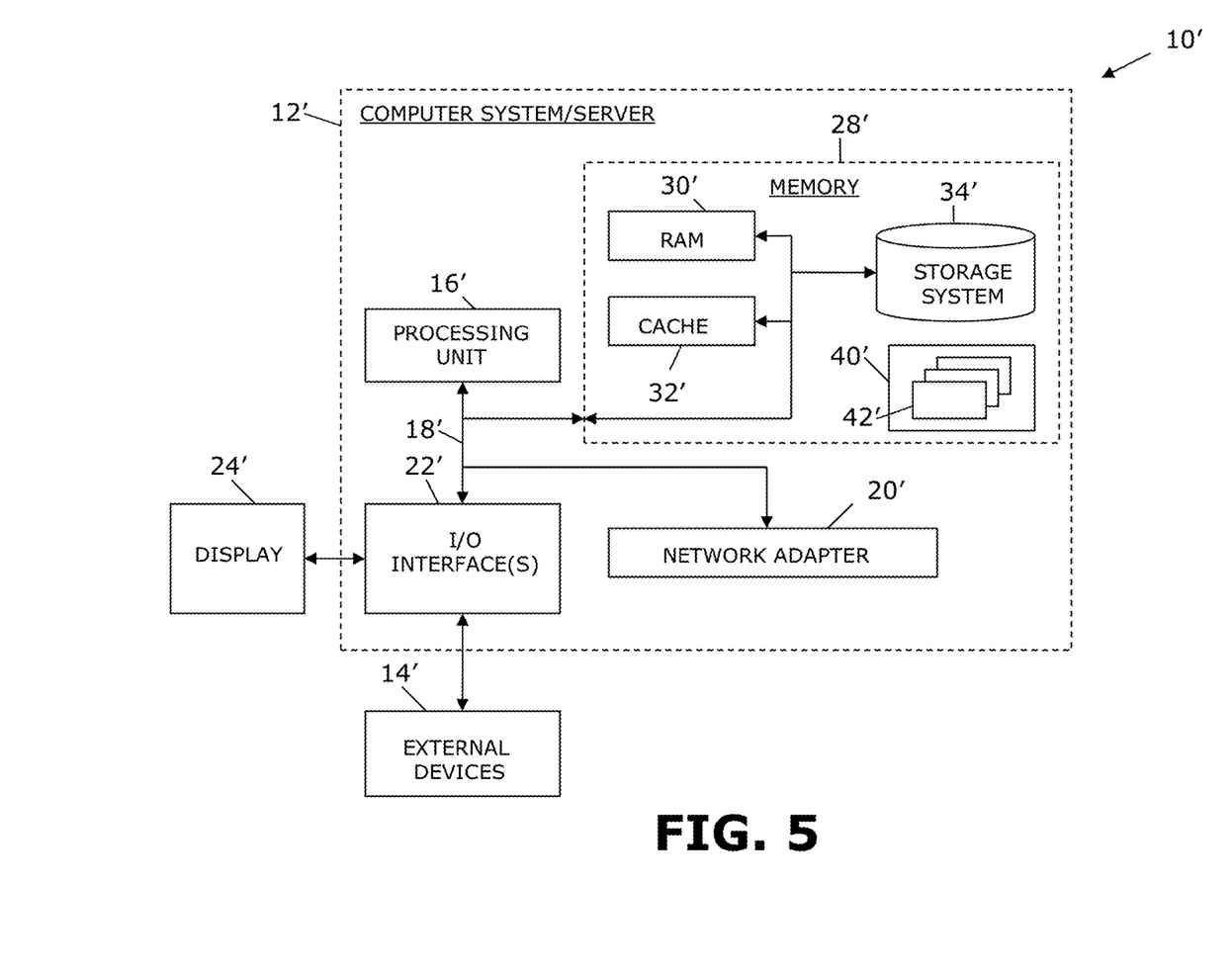
FIG. 5 illustrates a computer system.

Referring now to FIG. 5, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating a natural language resource using a parallel corpus, the method comprising:
    utilizing at least one processor to execute computer code that performs the steps of:
    receiving, from a parallel corpus, natural language text in a source language and a corresponding translation of the natural language text in a target language, wherein the natural language text in the source language comprises linguistic annotations;
    projecting the linguistic annotations from the source language natural language text to the target language natural language text;
    applying one or more filters to remove at least one projected linguistic annotation from the target language natural language text that results in at least one error, wherein the one or more filters are selected from the group consisting of: a filter for correcting a translation shift error and a reattachment heuristic filter;
    identifying and selecting at least one target language natural language text from a plurality of target natural language texts comprising filtered projected linguistic annotations, wherein the identifying and selecting comprises identifying and selecting comprises identifying a target language natural language text having complete linguistic annotations after the one or more filters have been applied;
    training a machine learning model using the identified and selected at least one target language natural language text and the projected and filtered annotations of the identified and selected at least one target language natural language text;
    adding, using the trained machine learning model, linguistic annotations to at least one target language natural language text having incomplete linguistic annotations; and
    generating, using the trained machine learning model, a natural language resource comprising the target language; and
    training a natural language annotator using the natural language resource.

2. The method of claim 1, wherein the one or more filters comprise at least one filter for correcting a translation shift error.

3. The method of claim 2, wherein the translation shift error comprises a word of the source language being aligned with a word in the target language having a different meaning.

4. The method of claim 2, wherein the translation shift error comprises a word of the source language being aligned with a word in the target language having a different syntactic role.

5. The method of claim 1, wherein the one or more filters comprise a reattachment heuristic filter for correcting an argument label being projected onto a word other than the syntactic head of a target verb's argument.

6. The method of claim 1, wherein the adding comprises supplementing at least one linguistic annotation for the at least one target natural language text.

7. The method of claim 6, wherein the supplementing comprises overwriting at least one linguistic annotation for the at least one target natural language text.

8. The method of claim 1, comprising conducting at least one additional iteration of selecting at least one target language natural language text, training a machine learning model, and adding linguistic annotations.

9. The method of claim 8, comprising generating a natural language resource, based upon the at least one additional iteration, comprising a plurality of target natural language text having annotations.

10. The method of claim 1, wherein the linguistic annotations comprises semantic role labels.

11. An apparatus for generating a natural language resource using a parallel corpus, the apparatus comprising:
at least one processor; and
a computer readable storage medium having computer readable program code embodied therewith and executable by the at least one processor, the computer readable program code comprising:
computer readable program code that receives, from a parallel corpus, natural language text in a source language and a corresponding translation of the natural language text in a target language, wherein the natural language text in the source language comprises linguistic annotations;
computer readable program code that projects the linguistic annotations from the source language natural language text to the target language natural language text;
computer readable program code that applies one or more filters to remove at least one projected linguistic annotation from the target language natural language text that results in at least one error, wherein the one or more filters are selected from the group consisting of: a filter for correcting a translation shift error and a reattachment heuristic filter;
computer readable program code that identifies and selects at least one target language natural language text from a plurality of target natural language texts comprising filtered projected linguistic annotations, wherein the identifying and selecting comprises identifying and selecting comprises identifying a target language natural language text having complete linguistic annotations after the one or more filters have been applied;
computer readable program code that trains a machine learning model using the identified and selected at least one target language natural language text and the projected and filtered annotations of the identified and selected at least one target language natural language text;
computer readable program code that adds, using the trained machine learning model, linguistic annotations to at least one target language natural language text having incomplete linguistic annotations; and
computer readable program code that generates, using the trained machine learning model, a natural language resource comprising the target language; and
training a natural language annotator using the natural language resource.

12. A computer program product for generating a natural language resource using a parallel corpus, the computer program product comprising:
a non-transitory computer readable storage medium having computer readable program code embodied therewith, the computer readable program code comprising:
computer readable program code that receives, from a parallel corpus, natural language text in a source language and a corresponding translation of the natural language text in a target language, wherein the natural language text in the source
language comprises linguistic annotations;
computer readable program code that projects the linguistic annotations from the source language natural language text to the target language natural language text;
computer readable program code that applies one or more filters to remove at least one projected linguistic annotation from the target language natural language text that results in at least one error, wherein the one or more filters are selected from the group consisting of: a filter for correcting a translation shift error and a reattachment heuristic filter;
computer readable program code that identifies and selects at least one target language natural language text from a plurality of target natural language texts comprising filtered projected linguistic annotations, wherein the identifying and selecting comprises identifying and selecting comprises identifying a target language natural language text having complete linguistic annotations after the one or more filters have been applied:
computer readable program code that trains a machine learning model using the identified and selected at least one target language natural language text and the projected and filtered annotations of the identified and selected at least one target language natural language text;
computer readable program code that adds, using the trained machine learning model, linguistic annotations to at least one target language natural language text having incomplete linguistic annotations; and
computer readable program code that generates, using the trained machine learning model, a natural language resource comprising the target language; and
training a natural language annotator using the natural language resource.

13. The computer program product of claim 12, wherein the one or more filters comprise at least one filter for correcting a translation shift error.

14. The computer program product of claim 13, wherein the translation shift error comprises a word of the source language being aligned with a word in the target language having a different meaning.

15. The computer program product of claim 13, wherein the translation shift error comprises a word of the source language being aligned with a word in the target language having a different syntactic role.

16. The computer program product of claim 12, wherein the one or more filters comprise a reattachment heuristic filter for correcting an argument label being projected onto a word other than the syntactic head of a target verb's argument.

17. The computer program product of claim 12, wherein the computer readable program code that adds comprises overwriting at least one linguistic annotation for the at least one target natural language text.

18. The computer program product of claim 12, comprising computer readable program code that conducts at least one additional iteration of selecting at least one target language natural language text, training a machine learning model, and adding linguistic annotations.

19. The computer program product of claim 18, comprising computer readable program code that generates a natural language resource, based upon the at least one additional iteration, comprising a plurality of target natural language text having annotations.

20. A method for generating a natural language resource using a parallel corpus, the method comprising:
utilizing at least one processor to execute computer code that performs the steps of:
receiving, from a parallel corpus, natural language text in a source language and a corresponding translation of the natural language text in a target language, wherein the natural language text in the source language comprises linguistic annotations;
projecting the linguistic annotations from the source language natural language text to the target language natural language text;
applying one or more filters to remove at least one projected linguistic annotation from the target language natural language text that results in at least one error, wherein the one or more filters are selected from the group consisting of: a filter for correcting a translation shift error and a reattachment heuristic filter;
identifying at least one target language natural language text from a plurality of target language natural language texts comprising filtered projected linguistic annotations, wherein the identifying comprises identifying a target language natural language text having complete linguistic annotations after the one or more filters have been applied;
selecting the at least one target language natural language text having complete linguistic annotations;
training a machine learning model using the selected at least one target language natural language text and the projected and filtered annotations of the selected at least one target language natural language text;
adding, using the trained machine learning model, linguistic annotations to at least one target language natural language text having incomplete linguistic annotations;
conducting at least one additional iteration of selecting at least one target language natural language text, training a machine learning model, and adding linguistic annotations;
generating a natural language resource, using the trained machine learning model trained from the at least one additional iteration, comprising a plurality of target natural language text having annotations; and
training a natural language annotator using the natural language resource.

* * * * *